(12) United States Patent
Bolton et al.

(10) Patent No.: US 9,586,180 B2
(45) Date of Patent: Mar. 7, 2017

(54) MEMBRANE EVAPORATION FOR GENERATING HIGHLY CONCENTRATED PROTEIN THERAPEUTICS

(75) Inventors: Glen Reed Bolton, Boston, MA (US); Hari Acharya, Troy, NY (US); Austin Wayne Boesch, Medford, MA (US)

(73) Assignee: Wyeth LLC, New York, NY (US)

( * ) Notice: Subject to any disclaimer, the term of this patent is extended or adjusted under 35 U.S.C. 154(b) by 0 days.

(21) Appl. No.: 13/259,341

(22) PCT Filed: Mar. 24, 2010

(86) PCT No.: PCT/US2010/028486
§ 371 (c)(1),
(2), (4) Date: Sep. 23, 2011

(87) PCT Pub. No.: WO2010/111378
PCT Pub. Date: Sep. 30, 2010

(65) Prior Publication Data
US 2012/0028878 A1    Feb. 2, 2012

Related U.S. Application Data

(60) Provisional application No. 61/162,743, filed on Mar. 24, 2009.

(51) Int. Cl.
| | | |
|---|---|---|
| *B01D 61/18* | (2006.01) |
| *B01D 61/14* | (2006.01) |
| *B01D 61/36* | (2006.01) |
| *B01D 61/24* | (2006.01) |

(52) U.S. Cl.
CPC ......... *B01D 61/364* (2013.01); *B01D 61/246* (2013.01); *B01D 2311/13* (2013.01)

(58) Field of Classification Search
CPC . B01D 61/246; B01D 2311/13; B01D 61/364
See application file for complete search history.

(56) References Cited

U.S. PATENT DOCUMENTS

| | | | |
|---|---|---|---|
| 4,816,567 A | | 3/1989 | Cabilly et al. |
| 5,736,051 A | * | 4/1998 | Degen et al. .................. 210/650 |
| 6,022,742 A | * | 2/2000 | Kopf .............................. 435/383 |
| 2003/0118592 A1 | | 6/2003 | Ledbetter et al. |
| 2003/0133939 A1 | | 7/2003 | Ledbetter et al. |
| 2004/0058445 A1 | | 3/2004 | Ledbetter et al. |
| 2005/0136049 A1 | | 6/2005 | Ledbetter et al. |
| 2005/0175614 A1 | | 8/2005 | Ledbetter et al. |
| 2005/0180970 A1 | | 8/2005 | Ledbetter et al. |
| 2005/0186216 A1 | | 8/2005 | Ledbetter et al. |
| 2005/0202012 A1 | | 9/2005 | Ledbetter et al. |
| 2005/0202023 A1 | | 9/2005 | Ledbetter et al. |
| 2005/0202028 A1 | | 9/2005 | Ledbetter et al. |
| 2005/0202534 A1 | | 9/2005 | Ledbetter et al. |
| 2005/0238646 A1 | | 10/2005 | Ledbetter et al. |
| 2006/0182740 A1 | | 8/2006 | Yang et al. |
| 2007/0002159 A1 | | 1/2007 | Olsen et al. |

FOREIGN PATENT DOCUMENTS

| | | |
|---|---|---|
| WO | WO 94/04678 | 3/1994 |
| WO | WO 95/35153 | 12/1995 |
| WO | WO 2009/129226 | 10/2009 |

OTHER PUBLICATIONS

Working with proteins: protein stability and storage, from www.uni-leipzig.edu/uspdu/teach.htm, pp. 1-3, accessed Oct. 23, 2013.*
Capillary Action, from http://science.jrank.org/pages/1182/Capillary-Action.html, p. 1, accessed Mar. 5, 2015.*
Hsieh, Liquid Transport in Fabric Structures, Textile Research Journal, 1995, 65, pp. 299-307.*
Protein Concentration and Diafiltration by Tangential Flow Filtration, from Millipore, pp. 1-24, published on Jun. 2003.*
Bird et al. (1988) Science 242:423-426, "Single-Chain Antigen-Binding Proteins".
Clackson et al. (1991) Nature 352:624-628, "Making antibody fragments using phage display libraries".
Dooley et al. (2006) Proc. Natl. Acad. Sci U.S.A. 103(6):1846-1851, "First molecular and biochemical analysis of in vivo affinity maturation in an ectothermic vertebrate".
Godino et al. (1996) J. Membr. Sci.121:83-93, "Membrane distillation: theory and experiments".
Huston et al. (1988) Proc. Natl. Acad. Sci. U.S.A. 85:5879-5883, "Protein engineering of antibody binding sites: recovery of specific activity in an anti-digoxin single-chain Fv analogue produced in Escherichia coli".
Khaeyet et al. (2000) J. Membr, Sci, 165:261-272, "Theory and experiments on sweeping gas membrane distillation".
Kohler et al. (1975) Nature 256:495-499, "Continuous cultures of fused cells secreting antibody of predefined specificity".
Kostelny et al. (1992) J. Immunol. 148:1547-1553, "Formation of a Bispecific Antibody by the Use of Leucine Zippers".
Kunz et al. (1996) J. Membr. Sci. 121:25-36, "Osmotic evaporation through macroporous hydrophobic membranes: A survey of current research and applications".
Marks et al. (1991) J. Mol. Biol. 222:581-597, "By-passing Immunization Human Antibodies from V-gene Libraries Displayed on Phage".
Songsivilai and Lachmann (1990) Clin. Exp. Immunol. 79:315-321, "Bispecific antibody: a tool for diagnosis and treatment of disease".
Stoner et al. (2004) J. Pharm. Sci. 93(9):2332-2342, "Protein-Solute Interactions Affect the Outcome of Ultrafiltration/Diafiltration Operations".
International Search Report and Written Opinion PCT/US2010/028486 dated Aug. 6, 2010.
Hausmann et al. (2011) Membranes 1:48-58, "Direct Contact Membrane Distillation of Dairy Process Streams".
Iversen et al., (1997) J. of Membrane Science, 130:205-217, "Characterization of microporous membranes for use in membrane contactors".
Liu et al., (2010) mAbs 2:5 480-499, "Recovery and purification process development for monoclonal antibody production".
Shire et al., (2004) J. Pharma. Sciences, 93:6 1390-1402, "Challenges in the Development of High Protein Concentration Formulations".

* cited by examiner

*Primary Examiner* — Julie Ha
*Assistant Examiner* — Li Ni Komatsu

(57) ABSTRACT

The present invention relates to methods of generating highly concentrated protein solutions, e.g., an antibody solution, a therapeutic protein solution, etc. The methods of the invention include membrane evaporation, such as evaporation of protein-free solvent from the protein solution, which concentrates the protein. The methods of the present invention result in protein solution concentrations not previously achievable by conventional ultrafiltration methods, e.g., protein solution concentrations of greater than about 260 grams of protein per liter of solution.

20 Claims, 6 Drawing Sheets

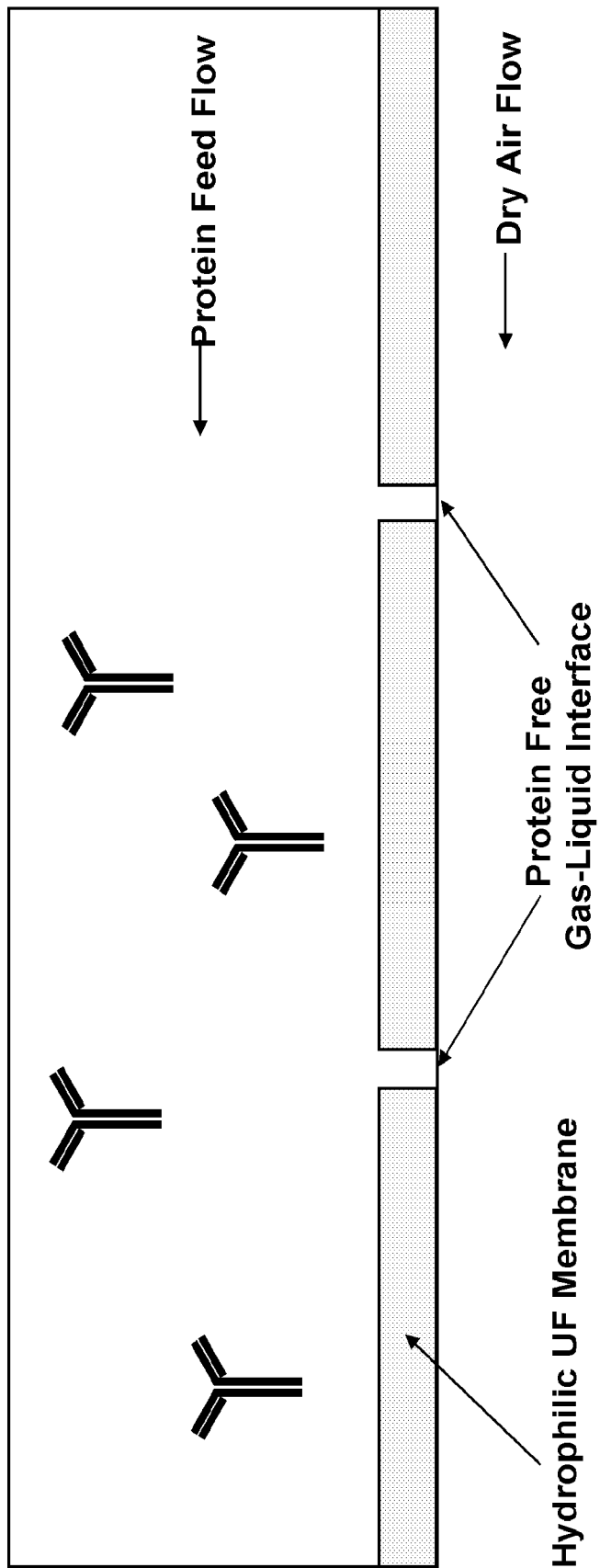

SCHEMATIC OF HYDROPHOBIC MEMBRANE EVAPORATION TECHNIQUE

MEMBRANE EVAPORATION FOR GENERATING HIGHLY CONCENTRATED PROTEIN THERAPEUTICS

RELATED APPLICATIONS

This application is a National Stage Application under 35U.S.C. §371 of International Application No. PCT/US10/28486, filed Mar. 24, 2010 which claims the benefit under 35U.S.C. §119(e) of U.S. Provisional Patent Application No. 61/162,743, filed Mar. 24, 2009 (expired), the contents of both are hereby incorporated by reference in their entirety.

BACKGROUND OF THE INVENTION

Field of the Invention

The present invention relates to methods of generating highly concentrated proteins, e.g., highly concentrated antibodies or protein therapeutics. Specifically, the invention relates to methods of generating highly concentrated proteins comprising circulating a first protein solution through an ultrafiltration device while applying a flow of gas to the permeate side of a porous membrane within the ultrafiltration device, and collecting a second protein solution, wherein the second protein solution is highly concentrated, e.g., greater than about 260 grams of protein per liter of solution. The invention also relates to apparatus for use in the method of generating highly concentrated proteins.

Related Background Art

The step of concentrating a protein in a solution is often the final step in protein production and purification, and it is commonly a necessary step for both biotechnology and pharmaceutical applications. However, currently utilized methods of protein concentration have several significant disadvantages.

For example, some methods for concentrating solutions involve distillation processes, e.g., osmotic distillation (also known as osmotic evaporation) or thermal distillation. In thermal distillation, two chambers of the apparatus—one containing the feed solution (such as a solute-containing solution, e.g., a protein-containing solution) and another containing the distillate (such as a solute-free solvent, e.g., a protein-free solvent)—are separated by a porous hydrophobic membrane. See, e.g., Godino et al. (1996) *J. Membr. Sci.* 121:83-93; Khaeyet et al. (2000) *J. Membr. Sci.* 165: 261-72. A temperature difference is maintained between the two chambers, such that the temperature of the feed-containing chamber is higher than the temperature of the distillate chamber. The temperature difference between the chambers causes a vapor pressure difference, which drives mass transfer from the feed-containing chamber to the distillate chamber. The gaseous phase is present only within the pores of the hydrophobic membrane. The major disadvantage of thermal distillation is that it is unsuitable for concentrating most protein solutions because high temperatures can damage protein solutes.

Osmotic distillation involves a similar principle to thermal distillation, except no temperature gradient is maintained between the two chambers. See, e.g., Kunz et al. (1996) *J. Membr. Sci.* 121:25-36. A hydrophobic porous membrane separates the two chambers, and the two chambers have different solute concentrations, which is the driving force for the mass transfer. The distillate chamber often contains high concentrations of solutes, e.g., salts, in order to maintain osmotic pressure differences. However, in this method, achievable protein concentrations are limited to the osmotic pressure of the salt solution. Additionally, the hydrophobic porous membrane creates an air-liquid interface, which can damage some proteins.

In a different method of protein concentration that does not employ osmotic or vapor pressure differences, a protein solution is pumped into an ultrafiltration device at high pressure, allowing solvent to flow through the membrane of the device while proteins are retained (see, e.g., FIG. 2). The protein-containing solution can be recirculated to a retentate tank as the solvent exits in the permeate. The solvent flow is caused by the difference in applied pressure between the retentate and the permeate sides of the device, typically about 10 to about 100 psig (pound-force per square inch gauge). When the concentration of the protein upstream of the membrane becomes high enough, the protein osmotic pressure becomes equal to the applied pressure gradient and the solvent flow stops (the gel-point). The disadvantage of this commonly used method is that this so-called "gel-point" limits the concentrations achievable with this method to a maximum of about 200 grams per liter for most proteins.

Thus, because of the limitations of existing protein concentration methods, there is a need for novel methods of producing highly concentrated protein solutions, e.g., a highly concentrated antibody solution, a highly concentrated therapeutic protein solution, etc. Protein concentrations are increased above the current range, e.g., about 50-200 g/L for an antibody solution, thus reducing storage volumes. In turn, freezer volume requirements are also reduced. The time and space required for freeze-drying (lyophilization) are reduced because there is up to, or greater than, approximately a 30% reduction in the volume of water that must be removed. A highly concentrated protein solution will increase the osmotic pressure of the solution, thereby preventing bacterial growth, and will increase viscosity of the protein solution, thereby increasing the residence time of the therapeutic protein in patients and increasing drug availability after administration.

SUMMARY OF THE INVENTION

The present invention provides methods for generating highly concentrated protein solutions, e.g., highly concentrated protein therapeutics and highly concentrated antibody solutions. The methods of the invention involve membrane evaporation, such as evaporation of protein-free solvent from the protein solution, leading to concentration of the protein solution. The methods of the present invention result in protein solution concentrations not previously achievable by conventional ultrafiltration methods, e.g., protein solution concentrations of greater than about 260 grams of protein per liter of solution. The invention also provides highly concentrated protein solutions produced by the methods of the invention, as well as apparatus for preparing highly concentrated protein solutions.

The methods of the invention can include several embodiments. At least one embodiment of the invention provides methods of generating highly concentrated protein solutions in an apparatus comprising the steps of circulating a first protein solution through an ultrafiltration device, wherein the ultrafiltration device comprises a porous membrane with a permeate side; applying a flow of gas to the permeate side of the porous membrane; and collecting a second protein solution, wherein the second protein solution is a highly concentrated protein solution. Ultrafiltration devices used in the methods of the invention can be of any type, e.g., a hollow fiber device; a plate and frame device; a spiral wound device; and a stirred cell device. In some embodiments, the step of circulating the first protein solution is repeated prior to the step of collecting the second protein solution. In some embodiments, the temperature outside the apparatus is about 2° C. to about 60° C., e.g., about 20° C. to about 45° C.

In some embodiments of the invention, the first protein solution is an antibody solution, e.g., a monoclonal antibody solution. In some embodiments, the first protein solution is a therapeutic protein solution.

The highly concentrated protein solutions produced by the methods of the invention can comprise, as nonlimiting examples, at least about 200 g/L of protein; at least about 260 g/L of protein; at least about 300 g/L of protein; at least about 350 g/L of protein; about 460 g/L of protein or greater; or any intermediate value.

In some embodiments of the invention, the methods result in less than about 30% increase, e.g., less than about 25%, 20%, 15%, 10%, 5%, 4%, 3%, 2%, 1%, 0.5%, or 0.1% increase, in the formation of high molecular weight (HMW) species in the highly concentrated protein solutions. In some embodiments of the invention, the methods result in less than about 30% increase, e.g., less than about 25%, 20%, 15%, 10%, 5%, 4%, 3%, 2%, 1%, 0.5%, or 0.1% increase, in the formation of low molecular weight (LMW) species in the highly concentrated protein solutions.

In some embodiments, the methods of the invention can further comprise a first step of generating a concentrated protein solution using a conventional ultrafiltration method(s).

In some embodiments of the invention, the flow of gas is a flow of air. In further embodiments, the flow of air is produced by a vacuum. In some embodiments, the flow of air is supplied at a pressure of about 100 psig or less. In some embodiments, the flow of air is supplied at a pressure of about 1-2 psig. In some embodiments, the porous membrane is a hydrophilic membrane; in some of these embodiments, applying the flow of gas to the permeate side of the porous membrane allows an aqueous buffer from the first protein solution to absorb into the porous membrane and to evaporate outside the porous membrane. In some other embodiments, the porous membrane is a hydrophobic membrane.

Other embodiments of the invention provide apparatus for preparing highly concentrated protein solutions, comprising a retentate tank; an ultrafiltration device with two ends that is connected to the retentate tank at one end of the ultrafiltration device, wherein the ultrafiltration device comprises a porous membrane with a permeate side; a device for applying a flow of gas to the permeate side of the porous membrane, wherein the flow of gas (e.g., a flow of air, e.g., a flow of air produced by a vacuum) allows an aqueous buffer in the ultrafiltration device to evaporate outside the porous membrane; and an outlet at the opposite end of the ultrafiltration device.

In some embodiments of the apparatus of the invention, the flow of air is supplied at a pressure of about 100 psig or less. In some embodiments, the flow of air is supplied at a pressure of about 1-2 psig. In some embodiments, the outlet at the opposite end of the ultrafiltration device is connected to, and returns solution back to, the retentate tank. In some embodiments, the porous membrane is a hydrophilic membrane; in some other embodiments, the porous membrane is a hydrophobic membrane.

The invention also provides highly concentrated protein solutions produced by the methods of the invention. In some embodiments, the protein solution is an antibody solution, e.g., a monoclonal antibody solution. In some embodiments, the protein solution is a therapeutic protein solution. In some embodiments, the invention provides a pharmaceutical composition comprising a highly concentrated protein solution of the invention and a pharmaceutically acceptable carrier.

The invention further provides methods of generating highly concentrated protein solutions, comprising the steps of loading a first protein solution into a retentate tank; allowing the first protein solution to flow from the retentate tank into an ultrafiltration device, wherein the ultrafiltration device comprises a porous membrane with a permeate side; circulating the first protein solution through the ultrafiltration device; applying a flow of gas to the permeate side of the porous membrane; and collecting a second protein solution, wherein the second protein solution is a highly concentrated protein solution.

Ultrafiltration devices used in the methods of the invention can be of any type, e.g., a hollow fiber device; a plate and frame device; a spiral wound device; and a stirred cell device. In some embodiments, the step of circulating the first protein solution is repeated prior to the step of collecting the second protein solution. In some embodiments, the temperature outside the apparatus is about 2° C. to about 60° C., e.g., about 20° C. to about 45° C. In some embodiments of the invention, the first protein solution is an antibody solution, e.g., a monoclonal antibody solution; in some embodiments, the first protein solution is a therapeutic protein solution. The highly concentrated protein solutions produced by the methods of the invention can comprise, as nonlimiting examples, at least about 200 g/L of protein; at least about 260 g/L of protein; at least about 300 g/L of protein; at least about 350 g/L of protein; about 460 g/L of protein or greater; or any intermediate value. In some embodiments of the invention, the methods result in less than about 30% increase, e.g., less than about 5% increase, e.g., less than about 4%, 3%, 2%, 1%, 0.5%, or 0.1% increase, in the formation of HMW and/or LMW species in the highly concentrated protein solutions.

In some embodiments, the methods of the invention can further comprise a first step of generating a concentrated protein solution using a conventional ultrafiltration method(s). In some embodiments of the invention, the flow of gas is a flow of air. In further embodiments, the flow of air is produced by a vacuum. In some embodiments, the flow of air is supplied at a pressure of about 100 psig or less; in some embodiments, the flow of air is supplied at a pressure of about 1-2 psig. In some embodiments, the porous membrane is a hydrophilic membrane; in some of these embodiments, applying the flow of gas to the permeate side of the porous membrane allows an aqueous buffer from the first protein solution to absorb into the porous membrane and to evaporate outside the porous membrane. In some other embodiments, the porous membrane is a hydrophobic membrane.

DETAILED DESCRIPTION OF THE INVENTION

Figure 1:
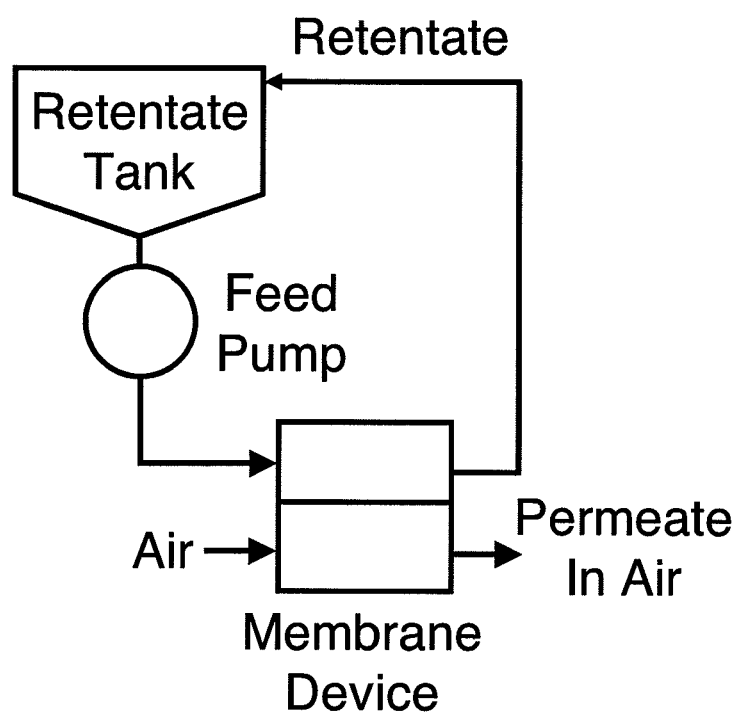
FIG. 1 depicts an exemplary apparatus of the invention.

The present invention relates to methods for generating highly concentrated protein solutions, e.g., a therapeutic protein solution, an antibody solution, etc. More specifically, the methods of the present invention can include the steps of circulating a first protein solution through an ultrafiltration device, wherein the ultrafiltration device is, e.g., a hollow fiber device, a plate and frame device, a spiral wound device, a stirred cell device, etc., and wherein the ultrafiltration device comprises a porous membrane; applying a flow(s) of gas, e.g., a flow of air, to the permeate side of the porous membrane; and collecting a second protein solution from the apparatus, wherein the second protein solution is a highly concentrated protein solution. The present invention also provides apparatus for generating highly concentrated protein solutions, protein solutions produced by the methods of the present invention, and pharmaceutical compositions comprising highly concentrated protein solutions.

Protein Solutions

Solutions used in the present invention can include protein solutions. As used herein and generally understood in the art, the terms "protein" or "protein of interest" refer to at least one chain of amino acids linked via sequential peptide bonds, and is generally synonymous with "polypeptide" or "polypeptide of interest." In certain embodiments, a protein of the present invention may be encoded by an exogenous DNA sequence (i.e., exogenous to the cell producing the protein). This sequence may be a sequence that occurs in nature, or may alternatively be a sequence engineered by man. Alternatively, a protein of the present invention may be encoded by an endogenous DNA sequence.

Methods of the present invention may be used to concentrate solutions of any protein of interest including, but not limited to, proteins having pharmaceutical, diagnostic, agricultural, and/or any of a variety of other properties that are useful in commercial, experimental, and/or other applications. In addition, a protein of interest can be a protein therapeutic. A "protein therapeutic" (or a "therapeutic protein") is, for example, a protein that has a biological effect in the body, or on a region in the body on which it directly acts, or on a region of the body on which it remotely acts via intermediates, etc. In certain embodiments, proteins concentrated using methods of the present invention may be processed and/or modified before being administered to a subject as a therapeutic protein.

The present invention may be used to concentrate any therapeutic protein, such as pharmaceutically or commercially relevant enzymes, receptors, receptor fusions, soluble receptors, soluble receptor fusions, antibodies (e.g., monoclonal and/or polyclonal antibodies), antigen-binding fragments of an antibody, Fc fusion proteins, SMIPs, cytokines, hormones, regulatory factors, growth factors, coagulation/clotting factors, and antigen-binding agents. The above list of proteins is merely exemplary in nature, and is not intended to be a limiting recitation. One of ordinary skill in the art will know of other proteins (or protein-like molecules) that can be concentrated in accordance with the present invention, and will be able to use the methods disclosed herein to concentrate such proteins or the like.

In certain embodiments of the invention, the protein to be concentrated in the protein solution is an antibody. The term antibody includes a protein comprising at least one and typically two VH domains or portions thereof, and/or at least one and typically two VL domains or portions thereof. In certain embodiments, the antibody is a tetramer of two heavy immunoglobulin chains and two light immunoglobulin chains, wherein the heavy and light immunoglobulin chains are interconnected by, e.g., disulfide bonds. The antibodies, or a portion thereof, can be obtained from any origin, including, but not limited to, rodent, primate (e.g., human and nonhuman primate), camelid, shark as well as recombinantly produced, e.g., chimeric, humanized, and/or in vitro generated, e.g., by methods well known to those of skill in the art.

This invention also encompasses "antigen-binding fragments of antibodies", which include, but are not limited to, (i) a Fab fragment, a monovalent fragment consisting of the VL, VH, CL, and CH1 domains; (ii) a F(ab')2 fragment, a bivalent fragment comprising two Fab fragments linked by a disulfide bridge at the hinge region; (iii) a Fd fragment consisting of the VH and CH1 domains; (iv) a Fv fragment consisting of the VL and VH domains of a single arm of an antibody, (v) a dAb fragment, which consists of a VH domain; (vi) a camelid or camelized variable domain, e.g., a VHH domain; (vii) a single chain Fv (scFv); (viii) a bispecific antibody; and (ix) one or more antigen binding fragments of an immunoglobulin fused to an Fc region. Furthermore, although the two domains of the Fv fragment, VL and VH, are coded for by separate genes, they can be joined, using recombinant methods, by a synthetic linker that enables them to be made as a single protein chain in which the VL and VH regions pair to form monovalent molecules (known as single chain Fv (scFv); see, e.g., Bird et al. (1988) *Science* 242:423-26; Huston et al. (1988) *Proc. Natl. Acad. Sci. U.S.A.* 85:5879-83). Such single-chain antibodies are also intended to be encompassed within the term "antigen-binding fragment" of an antibody. These antibody fragments are obtained using conventional techniques known to those skilled in the art, and the fragments are evaluated for function in the same manner as are intact antibodies.

The invention also encompasses single-domain antibodies. Single-domain antibodies can include antibodies whose complementarity determining regions are part of a single-domain polypeptide. Examples include, but are not limited to, heavy chain antibodies, antibodies naturally devoid of light chains, single-domain antibodies derived from conventional four-chain antibodies, engineered antibodies and single-domain scaffolds other than those derived from antibodies. Single-domain antibodies may be any of the art, or any future single-domain antibodies. Single-domain antibodies may be derived from any species including, but not limited to mouse, human, camel, llama, goat, rabbit, cow and shark. According to one aspect of the invention, a single-domain antibody as used herein is a naturally occurring single-domain antibody known as heavy chain antibody devoid of light chains. Such single-domain antibodies are disclosed in, e.g., WO 94/004678. For clarity reasons, this variable domain derived from a heavy chain antibody naturally devoid of light chain is known herein as a VHH or nanobody to distinguish it from the conventional VH of four-chain immunoglobulins. Such a VHH molecule can be derived from antibodies raised in *Camelidae* species, for example in camel, llama, dromedary, alpaca and guanaco. Other species besides *Camelidae* may produce heavy chain antibodies naturally devoid of light chain; such VHHs are within the scope of the invention. Single-domain antibodies also include shark IgNARs; see, e.g., Dooley et al. (2006) *Proc. Natl. Acad. Sci. U.S.A.* 103:1846-51.

Other than "bispecific" or "bifunctional" antibodies, an antibody is understood to have each of its binding sites identical. A "bispecific" or "bifunctional antibody" is an artificial hybrid antibody having two different heavy/light chain pairs and two different binding sites. Bispecific antibodies can be produced by a variety of methods including fusion of hybridomas or linking of Fab' fragments (see, e.g., Songsivilai and Lachmann (1990) *Clin. Exp. Immunol.* 79:315-21; Kostelny et al. (1992) *J. Immunol.* 148:1547-53).

In embodiments in which the protein is an antibody or a fragment thereof, the protein can include at least one, or two full-length heavy chains, and at least one, or two light chains. Alternatively, the antibodies or fragments thereof can include only an antigen-binding fragment (e.g., an Fab, F(ab')2, Fv, or a single chain Fv fragment). The antibody or fragment thereof can be a monoclonal or single specificity antibody. The antibody or fragment thereof can also be a human, humanized, chimeric, CDR-grafted, or in vitro-generated antibody. In yet other embodiments, the antibody has a heavy chain constant region chosen from, e.g., IgG1, IgG2, IgG3, or IgG4. In another embodiment, the antibody has a light chain chosen from, e.g., kappa or lambda. In at least one embodiment, the constant region is altered, e.g., mutated, to modify the properties of the antibody (e.g., to increase or decrease one or more of: Fc receptor binding, antibody glycosylation, the number of cysteine residues, effector cell function, or complement function). In some embodiments, the antibody or fragment thereof specifically binds to a predetermined antigen, e.g., an antigen associated with a disorder, e.g., a neurodegenerative, metabolic, inflammatory, autoimmune, and/or a malignant disorder.

Proteins described herein, optionally, further include a moiety that enhances one or more of, e.g., stability, effector cell function or complement fixation. For example, an antibody or antigen-binding protein can further include a pegylated moiety, albumin, or a heavy chain and/or a light chain constant region.

Antibodies are generally made, for example, via traditional hybridoma techniques (e.g., Kohler et al. (1975) *Nature* 256:495-99), recombinant DNA methods (e.g., U.S. Pat. No. 4,816,567), or phage-display techniques using antibody libraries (e.g., Clackson et al. (1991) *Nature* 352: 624-28; Marks et al. (1991) *J. Mol. Biol.* 222:581-97). The antibodies to be concentrated using the methods of the instant invention may be monoclonal or polyclonal antibodies. Methods of producing monoclonal and polyclonal antibodies are known in the art. For various other antibody production techniques, see, e.g., Antibodies: A Laboratory Manual (1988) eds. Harlow et al., Cold Spring Harbor Laboratory.

Further, the antibodies may be tagged with a detectable or functional label. These labels include radiolabels (e.g., $^{131}$I or $^{99}$Tc), enzymatic labels (e.g., horseradish peroxidase or alkaline phosphatase), and other chemical moieties (e.g., biotin).

"Small Modular Immunopharmaceutical" or SMIP™ drugs (Trubion Pharmaceuticals, Seattle, Wash.) are single-chain polypeptides composed of a binding domain for a cognate structure such as an antigen, a counterreceptor or the like, a hinge region polypeptide having either one or no cysteine residues, and immunoglobulin CH2 and CH3 domains (see also trubion.com). SMIPs and their uses and applications are disclosed in, e.g., U.S. Published Patent Application Nos. 2007/002159, 2003/0118592, 2003/ 0133939, 2004/0058445, 2005/0136049, 2005/0175614, 2005/0180970, 2005/0186216, 2005/0202012, 2005/ 0202023, 2005/0202028, 2005/0202534, and 2005/ 0238646, and related patent family members thereof, all of which are hereby incorporated by reference herein in their entireties.

A protein solution subjected to the methods of generating a highly concentrated protein solution of the present invention, e.g., a first protein solution, may be obtained as a result of purification of endogenously or exogenously expressed proteins, e.g., an exogenously produced recombinant protein. A skilled artisan will know cells and cell culture methods that are optimal for production of a particular protein.

Alternatively, a protein of the protein solution used for generation of a highly concentrated protein solution may be obtained by chemical protein synthesis. Techniques for chemical synthesis are generally known in the art, for example, a commercially available automated peptide synthesizer such as those manufactured by Applied Biosystems, Inc. (Foster City, Calif.).

For proteins of interest produced using cell culture methods, at the end of the cell culture, proteins may be collected and purified in order to obtain the first protein solution, i.e., the protein solution to be subjected to the methods of the present invention for generating a highly concentrated protein solution of the present invention. Soluble forms of proteins can be purified from conditioned media. Examples of soluble forms of proteins include cytokines, soluble receptor fusion proteins, antibodies, etc. Membrane-bound forms of the polypeptide can be purified by preparing a total membrane fraction from the expressing cells and extracting the membranes with a nonionic detergent such as TRITON® X-100 (EMD Biosciences, San Diego, Calif.). Cytosolic or nuclear proteins may be prepared by lysing the host cells (via mechanical force, Parr-bomb, sonication, detergent, etc.), removing the cell membrane fraction by centrifugation, and retaining the supernatant.

The polypeptide can be purified using other methods known to those skilled in the art. For example, a polypeptide produced by the disclosed methods can be concentrated using a commercially available protein concentration filter, for example, an AMICON® or PELLICON® ultrafiltration unit (Millpore, Billerica, MA). Following the concentration step, the concentrate can be applied to a purification matrix such as a gel filtration medium. Alternatively, an anion exchange resin (e.g., a MONO Q® coumn, Amersham Biosciences, Piscataway, N.J.) may be employed; such resin contains a matrix or substrate having pendant diethylaminoethyl (DEAE) or polyethylenimine (PEI) groups. The matrices used for purification can be acrylamide, agarose, dextran, cellulose or other types commonly employed in protein purification. Alternatively, a cation exchange step may be used for purification of proteins. Suitable cation exchangers include various insoluble matrices comprising sulfopropyl or carboxymethyl groups (e.g., S-SEPHAROSE® columns, Sigma-Aldrich, St, Louis, Mo).

The purification of the polypeptide from the culture supernatant may also include one or more column steps over affinity resins, such as concanavalin A-agarose, AF-HEP ARI 5U, heparin-TOYOPEARL® or CIBACRON® blue 3GA SEPHAROSE® (Tosoh Biosciences, San Francisco, Calif.); hydrophobic interaction chromatography columns using such resins as phenyl ether, butyl ether, or propyl ether; or immunoaffinity columns using antibodies to the labeled protein. Finally, one or more HPLC steps employing hydrophobic HPLC media, e.g., silica gel having pendant methyl or other aliphatic groups (e.g., Ni-NTA columns), can be employed to further purify the protein. Alternatively, the polypeptides may be recombinantly expressed in a form that facilitates purification. For example, the polypeptides may be expressed as a fusion with proteins such as maltose-binding protein (MBP), glutathione-S-transferase (GST), or thioredoxin (TRX); kits for expression and purification of such fusion proteins are commercially available from New England BioLabs (Beverly, Mass.), Pharmacia (Piscataway, N.J.), and Invitrogen (Carlsbad, CA), respectively. The proteins can also be tagged with a small epitope (e.g., His, myc or Flag tags) and subsequently identified or purified using a specific antibody to the chosen epitope. Antibodies to common epitopes are available from numerous commercial sources.

In embodiments of the present invention in which the protein solution to be used in generating a highly concentrated protein solution is an antibody solution, the solution may have been obtained by purifying antibodies from, e.g., animal sera, hybridoma cell culture supernatant, ascites fluid, etc., using, e.g., conventional methods for antibody purification (Protein A Chromatography, Protein G Chromatography, etc.). Methods for antibody purification are further described in Antibodies: A Laboratory Manual (1988) eds. Harlow et al., Cold Spring Harbor Laboratory.

An aqueous buffer in a protein solution that is used for generating a highly concentrated protein solution may be a final elution buffer from any of the above purification steps. Alternatively, a final elution buffer from any of the above purification steps may be replaced, e.g., by buffer exchange, into any suitable buffer, e.g., 12 mM histidine, pH 5.9. A skilled artisan will know which methods may be used to perform buffer exchanges of a protein solution.

Some or all of the foregoing purification steps in various combinations, either with or without other known methods, can be employed to purify a protein of interest and generate a first protein solution prior to generation of a highly concentrated protein solution of the present invention.

Apparatus for Generating Highly Concentrated Protein Solutions

In some embodiments, the apparatus of the present invention can comprise a retentate tank, an ultrafiltration device connected to the retentate tank on one end of the ultrafiltration device, and an outlet at a second end of the ultrafiltration device. In some embodiments, the outlet returns back to the retentate tank.

As used herein, "retentate" means that portion of a sample or solution that is substantially retained by the apparatus (sometimes referred to as the concentrate); in other words, the retentate is the portion of the sample or solution that remains on the upstream side of the membrane. Thus "retentate tank" refers to a tank that contains a portion of a sample substantially retained by the apparatus. As is well known to one skilled in the art, the retentate tank may be optionally connected to a feed tank, e.g., through a vent port, before and/or during system operation.

An exemplary apparatus of the invention is demonstrated in FIG. 1. In at least one embodiment, the apparatus for generating a highly concentrated protein solution of the invention comprises a retentate tank for loading a protein solution to be concentrated, i.e., a first protein solution. The retentate tank may be of any type known to those of ordinary skill in the art, such as a conical-bottom steel tank, a Teflon-lined tank, or a disposable bag from manufacturers like Millipore (Billerica, Mass.), Hyclone (Novato, Calif.), or Sartorius AG (Goettingen, Germany).

The first protein solution loaded into the retentate tank can be, e.g., a protein in an aqueous buffer, such as the final elution from any purification steps described above, or any other suitable buffer.

The retentate tank of the apparatus can be connected to an ultrafiltration device. In at least one embodiment of the invention, the ultrafiltration device is connected to the retentate tank in a loop, such that the first protein solution is allowed to return back to the retentate tank. This setup of the invention optionally allows for continuous recirculation of the solution throughout the apparatus.

The ultrafiltration device may be of any type known to those of ordinary skill in the art, such as, without limitation, a hollow fiber device, a plate and frame design or device, a stirred cell, a spiral wound device, etc. A hollow fiber device consists of a bundle of fibers potted at the ends in an epoxy or similar material to form a tube sheet. The hollow fiber device is operated by feed flow into the tube side, with the filtrate stream removed in the radial direction to the shell side. A plate and frame device consists of flat sheet membranes stacked between supporting plates. A stirred cell device consists of a container in which shearing and protein mixing are achieved by rapidly stirring the solution immediately adjacent to the membrane, typically using a stir bar or impeller. A spiral wound device uses pairs of flat sheet membranes bounded by porous mesh filtrate and feed spacers on the upstream and downstream sides, wound around a central filtrate collection tube.

In certain embodiments, the ultrafiltration device is a hollow fiber device, comprising a porous membrane, e.g., a hollow fiber porous membrane. In at least one embodiment of the invention, the membrane is a hydrophilic membrane, e.g., a hollow fiber porous membrane, such as a 30 kDa polysulfone hollow fiber cartridge (GE Healthcare, Westborough, Mass.). Thus, the porous membrane allows absorption of the protein-free solvent (e.g., aqueous buffer) into the membrane pores by capillary action (i.e., wicking forces).

In other embodiments of the invention, the membrane is a hydrophobic membrane, such as a hydrophobic microporous DURAPORE® PVDF membrane (Amicon 8019, Billerica, MA). In such embodiments, the solvent in the ultrafiltration device does not enter (or absorb into) the pores while in liquid form; rather the solvent enters the pores in a gaseous form. The hydrophobicity of the membrane prevents the protein from entering the membrane pores.

The porous membrane can contain pores of a particular size. A skilled artisan can determine the pore size of the membrane suitable for a particular application. In some embodiments, the size of the pores of the porous membrane is selected such that the aqueous buffer from the protein solution, e.g., a first protein solution, is allowed to absorb into the membrane, while the protein is retained inside the ultrafiltration device.

Additionally, the apparatus comprises a device for applying a flow of gas (e.g., air, nitrogen, dry steam, etc.) on the permeate side of the membrane, i.e., downstream of the membrane, as shown in FIG. 1. The permeate side of the membrane is the side of the membrane that allows protein-free buffer to be removed from the first protein solution, e.g., to evaporate from the first protein solution. A flow of gas applied to the permeate side of the membrane can be generated using, e.g., a compressor, a compressed air tank, a fan, a device that heats air/gas to generate flow, a vacuum pump, etc. In at least one embodiment, the flow of gas is applied across the permeate side of the hollow fiber porous membrane.

Methods of the invention can include embodiments in which a flow of gas applied on the permeate side of the membrane is a flow of air. The air flow may be applied and/or produced by any device, method, or way of generating air flow known to one of ordinary skill in the art, such as, but not limited to, a compressor, a compressed air tank, a fan, a device that heats air to generate flow, and/or a vacuum pump. In at least one embodiment, the flow of air is created by blowing ambient (house) air with an inlet pressure of 1-2 psig, although pressures up to the limits tolerated by the filter devices, e.g., up to about 100 psig, can be used. Additionally, the apparatus can be connected to a feed pump that pumps the protein solution through the apparatus.

Figure 2:
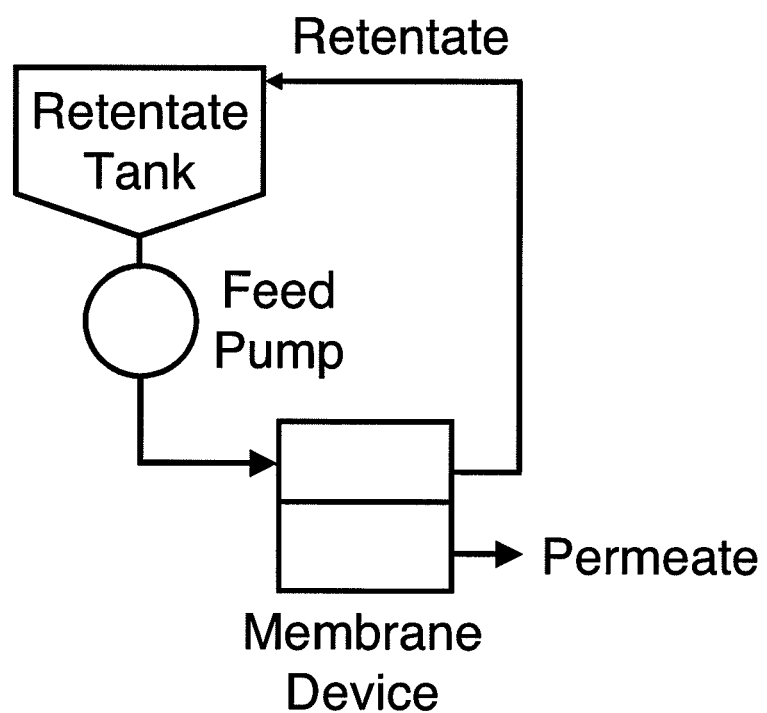
FIG. 2 depicts an apparatus for performing a conventional ultrafiltration (UF) procedure.

An apparatus of the invention may optionally comprise a device or way to switch the mode of operation from a conventional ultrafiltration method, such as that depicted in FIG. 2, to a method(s) of the present invention, i.e., evaporation-driven methods. Thus, in some embodiments of the invention, the apparatus can be operated in a conventional ultrafiltration mode until the permeate flux approaches zero. This point is often referred to as the gel-point. At that point, the apparatus can be switched to a method(s) of the present invention. Alternatively, a first apparatus can be used to concentrate the protein in a conventional ultrafiltration mode and then the fluid can be transferred to a second apparatus used to concentrate the protein based on a method(s) of the invention.

A skilled artisan will be aware, based on the general description of the apparatus of the invention herein, of other possible modifications that can be made to the apparatus. Such modifications to the apparatus are encompassed by the present invention.

Methods of Generating Highly Concentrated Protein Solutions

In at least one embodiment of the present invention, methods of generating highly concentrated protein solutions include the steps of circulating a first protein solution through a filtration device, such as an ultrafiltration device, wherein the ultrafiltration device comprises a porous membrane; applying a flow(s) of gas, e.g., a flow of air, to the permeate side of the porous membrane, i.e., the downstream side of the membrane in the ultrafiltration device; and collecting a second protein solution from the apparatus, wherein the second protein solution is a highly concentrated protein solution.

In another embodiment, the method comprises loading a first protein solution into a retentate tank; allowing the first protein solution to flow from the retentate tank into an ultrafiltration device, wherein the ultrafiltration device comprises a porous membrane; filtering the first protein solution with the ultrafiltration device; applying a flow of gas, e.g., a flow of air, to the permeate side of the porous membrane, i.e., downstream of the membrane in the ultrafiltration device; and collecting a second protein solution from the apparatus, wherein the second protein solution is a highly concentrated protein solution.

The step of allowing a first protein solution to enter the ultrafiltration device from a retentate tank may comprise, e.g., opening a valve between the retentate tank and the ultrafiltration device, and permitting or forcing the first protein solution to enter the ultrafiltration device at a flow rate. In at least one embodiment, the step of allowing the first protein solution to enter the ultrafiltration device from the retentate tank comprises turning on a peristaltic pump (e.g., a feed pump) located between the retentate tank and the ultrafiltration device. The flow rate, for example, the speed of the peristaltic pump, may be about 1 to about 10,000 liters per square meter of membrane area per hour.

Methods of the invention can include embodiments in which a protein solution is pumped into the ultrafiltration device at high pressure. In at least one embodiment, the ultrafiltration device comprises a porous membrane, e.g., a hollow fiber porous membrane, such that the porous membrane will absorb the protein-free solvent (e.g., an aqueous buffer) from the first protein solution. Methods of the invention can include embodiments in which the protein-free solvent is absorbed into the membrane by capillary forces (or wicking forces), which are typically higher that the forces that can be created by pressurizing the retentate side of the membrane (i.e., the inner or upstream side of the membrane). Exposure of the permeate side of the membrane to a flow of gas (e.g., a flow of air) allows evaporation of the absorbed protein-free solvent into the air; such gradual evaporation and removal of the solvent concentrates the protein solution, while the membrane prevents the protein from being exposed to air interfaces, which are known to potentially damage proteins. The air flowing across the downstream side of the membrane, i.e., the permeate side of the membrane, allows faster evaporation of the protein-free solvent from the membrane. In at least one embodiment of the invention, the air flow, e.g., from an ambient (house) air supply, is supplied at a pressure of about 1-2 psig.

In some embodiments of the invention, the air flowing across the permeate side of the membrane is maintained at an ambient temperature, e.g., about 25° C. The protein solution within the apparatus is typically maintained at a temperature that best retains the stability of the proteins, e.g., a temperature in the range of about 2° C. to about 45° C., e.g., between about 18° C. and about 35° C. In some embodiments, the temperature outside the apparatus is maintained at a temperature in the range of about 2° C. to about 60° C., e.g., between about 2° C. to about 45° C., e.g., between about 20° C. and about 45° C. Heat can be applied to the system, or to just the permeate side of the membrane, using, e.g., electric heating elements in or near the ultrafiltration device or retentate tank, hot air or dry steam on the permeate side of the membrane, a radiation source such as a heat lamp, etc. At higher temperatures, the evaporation will occur more rapidly, the solution will be less viscous, and the protein mass transfer within the device will improve. These benefits must be weighed against any potential protein stability concerns that may exist at higher temperatures. A skilled artisan will understand that, depending on the origin and use of the protein, the temperature at which the protein is stable will differ; thus, a skilled artisan will know at which temperature to maintain the protein solution inside the apparatus.

In some embodiments of the methods of the invention, the first protein solution circulates through the ultrafiltration device. Methods of the invention can include embodiments in which the protein solution is returned to the retentate tank. At that point the retentate, i.e., the protein solution remaining in the apparatus, may be collected. Alternatively, the protein solution may be returned to the retentate tank and allowed to recirculate through the ultrafiltration device. In at least one embodiment of the invention, the first protein solution is allowed to continuously recirculate through the ultrafiltration device.

When the protein solution inside the apparatus achieves a desired concentration value or a desired feed pressure, the recirculation may be ramped down and the highly concentrated protein solution, i.e., a second protein solution, may be collected. The highly concentrated protein solution is at least about 200 g/L, e.g., at least about 260 g/L, about 300 g/L, about 350 g/L, or about 460 g/L or greater.

One skilled in the art will understand that the protein concentration may be measured utilizing a variety of methods known in the art, such as UV spectrophotometry or ELISA. In some embodiments of the invention, the protein concentration is measured by absorbance of ultraviolet light with a wavelength of 280 nm. The measurement is typically corrected for the presence of large particles by subtracting the absorbance signal at 320 nm. After the protein is concentrated and recovered, the protein may be characterized using a variety of methods to ensure that protein quality is not impacted. The percentage of protein that is high and low molecular weight species can be determined using size-exclusion chromatography. A bioactivity assay may be used to determine whether the protein still retains the ability to carry out the desired biological function. The protein may be characterized with mass-spectrometry, SDS-PAGE, isoelectric focusing (IEF) gels, ion exchange chromatography, or capillary electrophoresis to determine whether there is any impact to the amino acids, amino acid chains, or any polysaccharide components. The protein structure can be characterized using techniques such as differential scanning calorimetry, near and far UV scans, and circular dichroism.

Methods of the invention can include embodiments in which the initial feed pressure in the apparatus is at least about 5 psig, e.g., between about 5 psig and the maximum feed pressure limit of the device, and the first protein solution is recirculated through the ultrafiltration device. When operating at a fixed feed flow rate, the viscosity and feed pressure will increase as the protein concentrates. When the feed pressure reaches the limit of the device, the feed flow rate can be decreased to maintain the feed pressure near the maximum value. To prevent the protein solution from becoming too viscous or dry in the filter device, the feed flow rate must significantly exceed, e.g., exceed by at least about two-fold, the rate at which solvent is evaporated on the permeate side of the membrane. The concentration run ("run") will be stopped when (1) the feed pressure is near the limit of the filter device while the feed flow rate is less than double the permeate flow rate, (2) the process time limit is reached, or (3) the protein concentration target is achieved.

Methods of protein concentration may lead to formation of protein aggregates in the solution, such as low molecular weight and high molecular weight aggregates. Such aggregates produce nonfunctional, suboptimal, or undesired protein product(s).

The terms "low molecular weigh aggregates" or "low molecular weight species" (abbreviated as LMWs) refer to proteins that appear to have a lower molecular weight than the protein of interest. LMWs may be fragments of the protein of interest or fragments of other species from the media, host cells, or solution components. The terms "high molecular weight aggregate" or "high molecular weight species" (HMWs) refer to an undesirable byproduct(s) of protein production that results from association between at least two proteins. HMWs may be an association between at least two of the same proteins and/or an association between the protein of interest and another protein(s) or fragment(s). The association may arise by any method including, but not limited to, covalent, noncovalent, disulfide, and/or nonreducible crosslinking. One skilled in the art will understand that when a protein is active in a multimer form (e.g., a dimer form), i.e., when more than one polypeptide chain is required for protein activity, the term "high molecular weight aggregates" and the like will refer to an association between two or more of such multimeric forms. One skilled in the art will know techniques required to monitor and affect production of both low and high molecular weight aggregates, e.g., size-exclusion high performance liquid chromatography (SEC-HPLC).

The methods of generating a highly concentrated protein solution of the present invention result in small increases of both HMW and LMW aggregates. In some embodiments of the invention, the methods result in less than about 30% increase in formation of HMW and/or LMW aggregates, e.g., less than about 5% increase in formation of HMW and/or LMW aggregates, e.g., less than about 2.2% increase in formation of HMW and/or LMW aggregates.

A skilled artisan will know that it is important to control the pH of an ultrafiltration pool (i.e., a pool of solutions that is obtained after a full purification process, including an ultrafiltration step) to ensure protein quality and stability. Imbalances in pH and small solute concentration can exist between the permeate solution and the concentrated protein solution after a conventional ultrafiltration step due to the Donnan effect, as described by, e.g., Stoner et al. (2004) *J. Pharm. Sci.* 93:2332-42. According to the Donnan effect, electroneutrality is maintained on either side of the membrane, and there exists an equichemical potential across the membrane for each counter-ion pair. Such electroneutrality leads to retention of small ions that have a charge opposite that of the protein, and increased passage of solutes with the same charge as the protein, causing a difference in pH between the retentate and permeate sides of the membrane (i.e., between the upstream and downstream sides), resulting in pH fluctuations of the retentate. The offset in small solute concentrations can be secondarily attributed to the excluded volume of the protein and solute-protein binding. Methods of protein concentration according to the present invention will not lead to fluctuations in the pH of the retentate because small ions are retained inside the ultrafiltration device and typically do not evaporate with the solvent.

The methods of the present invention allow concentration of a protein, e.g., a monoclonal antibody, to at least about 200 g/L, e.g., at least about 260 g/L, about 300 g/L, about 350 g/L, or about 460 g/L or greater. The capillary pressure that draws water into the pores of the hollow fiber porous membrane is at least an order of magnitude higher than the osmotic pressure in a concentrated protein solution. This causes water to flow out of even the most concentrated protein solutions. The protein-free solvent in the membrane pores evaporates into the air regardless of the upstream protein concentrations. These two effects allow the methods of the present invention to achieve protein concentrations that are not possible with conventional pressurized ultrafiltration systems, such as the conventional system depicted in FIG. 2.

In at least one embodiment of the invention, the protein solution concentrated utilizing methods of the invention is an antibody solution. The antibody solution concentrated by such methods can be a monoclonal antibody solution. In other embodiments, the protein solution concentrated is a therapeutic protein solution, e.g., wherein the protein in the protein solution is a therapeutic protein.

One skilled in the art will understand that any solution can be concentrated utilizing the methods of the invention, although in particular embodiments the solution concentrated is a protein solution. For example, solutions to be concentrated can include beverage solutions, such as juice or milk. A skilled artisan will understand that in order to concentrate a solute of interest in a solution, the hollow fiber porous membrane should be impermeable to the solute of interest. Concentration of solutions other than protein solutions utilizing the methods described herein is further contemplated by the present invention.

A skilled artisan will be aware, based on the general description of the methods of the invention herein, of other possible alterations that can be made to the methods. Such alterations of the methods are encompassed by the present invention.

Pharmaceutical Compositions

In certain embodiments of the invention, a protein solution concentrated according to one or more methods of the present invention can be useful in the preparation of pharmaceuticals. Protein solutions concentrated according to one or more methods of the invention may be administered to a subject or may first be formulated for delivery by any available route including, but not limited to, e.g., parenteral (e.g., intravenous), intradermal, subcutaneous, oral, nasal, bronchial, ophthalmic, transdermal (topical), transmucosal, rectal, and vaginal routes. Inventive pharmaceutical compositions typically include a purified protein expressed from a mammalian cell line and a delivery agent (e.g., a cationic polymer, peptide molecular transporter, surfactant, etc.) in combination with a pharmaceutically acceptable carrier. As used herein the language "pharmaceutically acceptable carrier" includes nontoxic materials that do not interfere significantly with the effectiveness/biological activity of the active ingredient(s), e.g., solvents, dispersion media, coatings, antibacterial and antifungal agents, isotonic and absorption delaying agents, and the like, compatible with pharmaceutical administration. The characteristics of the carrier will depend on the route of administration. Supplementary active compounds can also be incorporated into the compositions.

A pharmaceutical composition is formulated to be compatible with its intended route of administration. When the therapeutic protein produced according to one or more methods of the present invention is administered in an oral form, the pharmaceutical composition will be in the form of a tablet, capsule, powder, solution, emulsion, or elixir. When administered in tablet form, the pharmaceutical composition of the invention may additionally contain a solid carrier such as a gelatin or an adjuvant. The tablet, capsule, and powder will contain from about 5 to about 95% binding agent, e.g., from about 25 to about 90% binding agent.

When the therapeutic protein produced according to one or more methods of the present invention is administered in liquid form (e.g., a solution, emulsion, or elixir), a liquid carrier such as water, petroleum, oils of animal or plant origin, such as sesame oil, peanut oil (taking into consideration the occurrence of allergic reactions in the population), mineral oil, soybean oil, synthetic oils, and/or alcohol may be added. The liquid form of the pharmaceutical composition may further contain physiological saline solution, dextrose or other saccharide solutions, or glycols such as ethylene glycol, propylene glycol, or polyethylene glycol. When administered in liquid form, the pharmaceutical composition contains from about 0.5% to about 90% by weight of the binding agent, e.g., from about 1% to about 50% by weight of the binding agent. One of ordinary skill in the art will know formulations to be used in these settings.

When the therapeutic protein produced according to one or more methods of the present invention is administered by intravenous, cutaneous or subcutaneous injection, the therapeutic protein will be in the form of a pyrogen-free, parenterally acceptable aqueous solution. The preparation of such parenterally acceptable protein solutions, having due regard to pH, isotonicity, stability, and the like, is within the skill of those in the art. In some embodiments, a pharmaceutical composition for intravenous, cutaneous, or subcutaneous injection can contain, in addition to the therapeutic protein, an isotonic vehicle such as sodium chloride injection, Ringer's injection, dextrose injection, dextrose and sodium chloride injection, lactated Ringer's injection, or other vehicle as known in the art. The pharmaceutical composition of the present invention may also contain stabilizers, preservatives, buffers, antioxidants, or other additives known to those of skill in the art.

The amount of a polypeptide of the invention in the pharmaceutical composition of the present invention will depend upon the nature and severity of the condition being treated, and on the nature of prior treatments that the patient has undergone. Ultimately, the attending physician will decide the amount of a pharmaceutical composition or polypeptide of the invention with which to treat each individual patient. Initially, the attending physician will administer small doses of a pharmaceutical composition/polypeptide of the invention and observe the patient's response. Larger doses of a pharmaceutical composition/polypeptide of the invention may be administered until the optimal therapeutic effect is obtained for the patient, and at that point the dosage is not generally increased further. It is contemplated that the various pharmaceutical compositions used to treat a subject in need thereof should contain about 0.1 µg to about 100 mg of a polypeptide of the invention per kg body weight.

The duration of intravenous (i.v.) therapy using a pharmaceutical composition of the present invention will vary, depending on the severity of the disease being treated and the condition and potential idiosyncratic response of each individual patient. It is contemplated that the duration of each application of a pharmaceutical composition or a polypeptide of the present invention may be within the range of, e.g., 1-12, 6-18, or 12-24 hrs of continuous or intermittent i.v. administration. Also contemplated are subcutaneous (s.c.) and intramuscular (i.m.) therapies using a pharmaceutical composition of the present invention. These therapies can be administered, as nonlimiting examples, daily, weekly, biweekly, or monthly. Ultimately the attending physician will decide on the appropriate duration of i.v., i.m., or s.c. therapy, or therapy with a small molecule, and the timing of administration of the therapy, using a pharmaceutical composition of the present invention.

Additional formulations of the pharmaceutical compositions comprising the therapeutic protein solutions concentrated by one or more methods of the present invention will be known to those skilled in the art. One of ordinary skill in the art will also be aware of unit dosage formulations appropriate for proteins produced according to the present invention.

The entire contents of all references, patents, and patent applications cited throughout this application are hereby incorporated by reference herein.

EXAMPLES

The Examples which follow are set forth to aid in the understanding of the invention but are not intended to, and should not be construed to, limit the scope of the invention in any way. The Examples do not include detailed descriptions of conventional methods, e.g., cloning, transfection, basic aspects of methods for overexpressing proteins in cell lines, and basic methods for protein purification. Such methods are well known to those of ordinary skill in the art.

Example 1

The objective of the experiments was to concentrate monoclonal antibody 1 (mAb1) using a membrane evaporation technique in an ultrafiltration device comprising a hollow fiber porous membrane. Hollow fiber tubes made by GE Healthcare (UFP-30-E-H22LA and UFP-30-E-4MA, Westborough, Mass.) were used in a manner consistent with traditional (conventional) ultrafiltration (UF), with the exception of the use of the novel evaporative concentration technique of the present invention.

The mAb1 material was obtained from the pool that follows protein A purification and further purified by filtering it through a Millipore A1HC membrane (Billerica, Mass.). The material was buffer exchanged into a pH 5.9, 12 mM histidine buffer and concentrated to 150 g/L. This material was used as the starting load for the experiments.

The load material was processed using a 30 kDa hydrophilic polysulfone hollow fiber cartridge (GE Healthcare) with 1 mm lumen. Membranes of different area were used for the two runs (38 cm$^2$ and 420 cm$^2$). The new filters were rinsed with water prior to use to remove the storage solution, Becton Dickinson pressure transducers (Newark, DE) were placed at the feed and retentate ports on the cartridge. The ultrafiltration system was operated with a Scilog peristaltic pump (Scilog Model 1081, Middleton, WI). The 500ml Pall MINIM™ vessel (FS700MO1, Pall, East Hills, NY) was used as the retentate tank and agitated with a magnetic stir bar. The system was sealed except for a luer vent port on the top of the tank, which was open when the system was in operation, When not in use, the system was completely sealed.

Initially the load was concentrated through conventional operation of the ultrafiltration system (see, e.g., FIG. 2). The hollow fiber cartridge was operated with a channel pressure drop of 10 psig and a transmembrane pressure drop of 25 psig. The feed channel pressure drop increased as the solution concentrated and became more viscous. Once a feed pressure of 40 psig was reached, the concentration method was switched to a membrane evaporation method of the invention (see, e.g., FIG. 1).

The conventional ultrafiltration operation brought the solution to approximately 200 g/L, i.e., the gel-point; above 200 g/L, viscosity increased exponentially, which limited further filtration and concentration of the protein (data not shown).

During the membrane evaporation method, house (ambient) air was blown on the permeate side of the membrane with an inlet pressure of 1-2 psig. The feed material was recirculated at a slow flow rate with an initial feed pressure ranging between 10-15 psig and an open retentate valve. This concentration process was continued until the material viscosity caused the feed pressure to exceed 40 psig. At this point, the recirculation flow rate was ramped down, and the material was collected. Using the hollow fiber membrane evaporation method, the final protein concentration exceeded the maximum protein concentration achievable with conventional ultrafiltration, even with significantly increased solution viscosity (FIG. 3; Hollow Fiber).

The final concentrations for Run 1 and Run 2 measured as absorbance at 280 nm are listed in Table 1, along with size exclusion chromatography (SEC) results. The SEC method indicates whether the ultrafiltration caused the formation of high molecular weight (HMW) or low molecular weight (LMW) species. Generation of HMW and/or LMW aggregates is considered an indicator of protein damage. HPLC-SEC analysis was performed with the sample diluted to 1 mg/ml prior to loading on the HPLC column.

TABLE 1

|  | Concentration (g/L) | % HMW | % LMW | pH |
|---|---|---|---|---|
| Load 1 | 148 | 3.0 | 1.1 | 6.2 |
| Run 1 | 326 | 3.0 | 1.1 | 6.3 |
| Load 2 | 148 | 3.2 | 3.6 | N/R |
| Run 2 | 319 | 5.3 | 3.6 | 6.4 |

The HPLC-SEC results did not change between Load 1 and Run 1, indicating the operation did not affect the protein characteristics. In Run 2, there was a small increase in HMW aggregates; this indicates there was some protein damage. The amount of protein damage is considered small, though, because the difference in % HMW between Load 2 and Run 2 was only about 2.1%.

Example 2

The objective of the experiments was to concentrate mAb1 using a membrane evaporation technique in an ultrafiltration device comprising a stirred cell. A stirred cell made by Millipore (Amicon 8010, Billerica, Mass.) with a 30 kDa ultrafiltration membrane was used in a manner consistent with traditional UF, with the exception of the use of the novel evaporative concentration technique of the present invention.

The mAb1 material was obtained from the conventional ultrafiltration pool that results from a full purification process. A protein A chromatography column, an anion exchange chromatography column, a virus-retaining filter (e.g., a PLANOVAT™ 20 filter (Asahi Kasei Corporation, Tokyo, Japan)), and an ultrafilter were used in this full purification process. The protein was at 171gIL n 6mM histidine, 8 mM methionine, pH 6.0 buffer. This material was used as the starting load for the experiments.

The load material was processed using a 30 kDa regenerated cellulose membrane (Millipore PLCTK). The new filters were rinsed with water prior to use to remove the storage solution. The system was stirred at 80 RPM with a power stirrer (GLAS-COL® 099DGT31, Terre Haute, IN) and an impeller through an opening in the top. When not in use, the system was completely sealed.

During the membrane evaporation method, house (ambient) air was blown through holes in the stirred cell base plate on the permeate side of the membrane at 1.2 psig.

TABLE 2

|  | Concentration (g/L) | % HMW | % LMW |
|---|---|---|---|
| Load | 171 | 2.7 | 0.3 |
| Pool | 461 | 2.6 | 0.3 |

Figure 3:
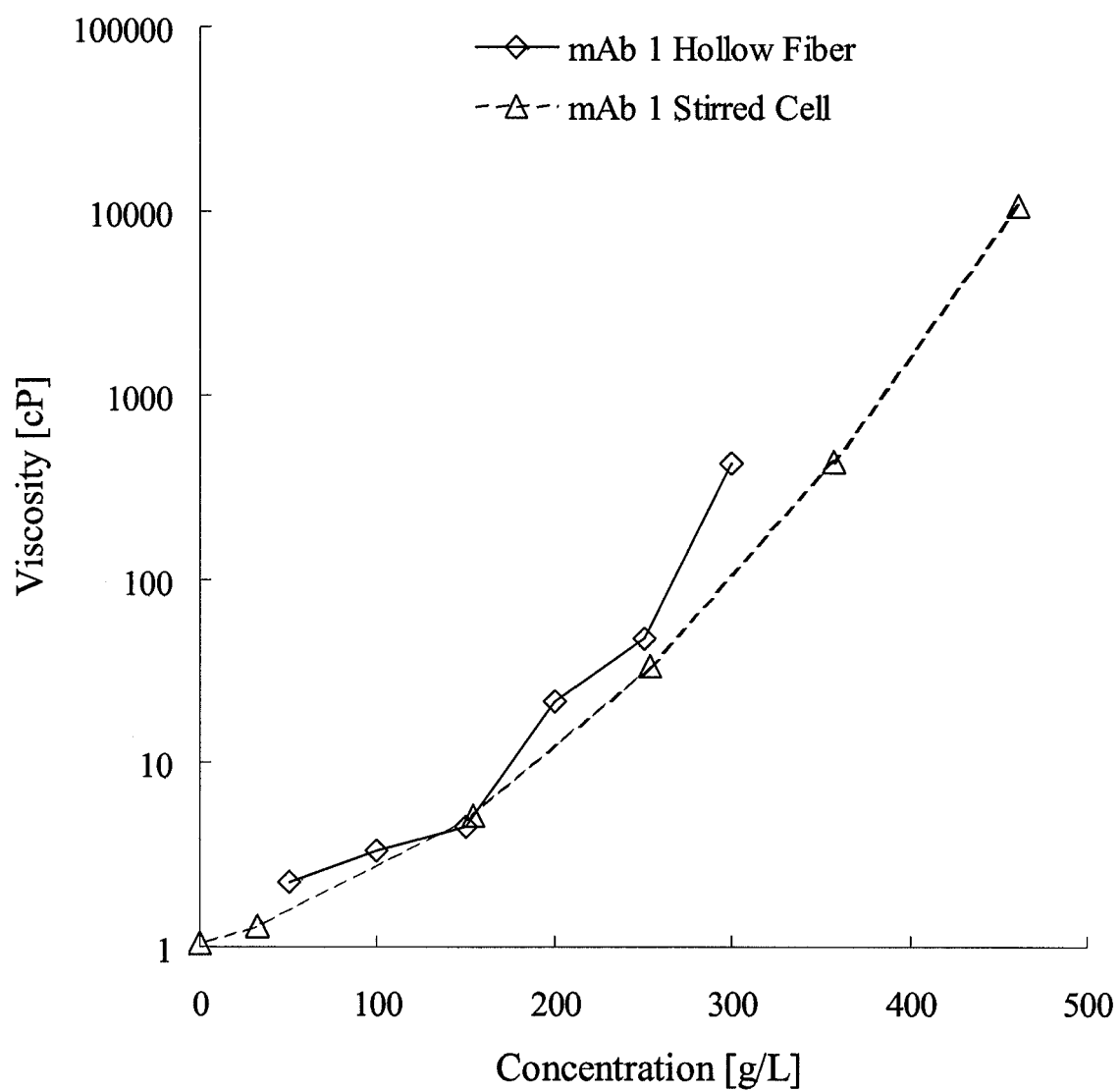
FIG. 3 depicts the increase in viscosity of the protein solution (Y-Axis; [cP]) with the increasing protein concentration in protein solution (X-Axis; (g/L)) concentrated using either a hollow fiber ultrafiltration device (open diamonds) or a stirred cell ultrafiltration device (open triangles).

Using the stirred cell membrane evaporation device, final protein concentration exceeded the maximum protein concentration achievable with conventional ultrafiltration, even with significantly increased solution viscosity (FIG. 3; Stirred Cell). The final concentrations measured as absorbance at 280 nm are listed in Table 2, along with SEC results. HPLC-SEC analysis was performed with the sample diluted to 1 mg/ml prior to loading on the HPLC column. The HPLC-SEC results indicated that the operation did not affect the protein characteristics.

Example 3

The objective of the experiments was to concentrate mAb1 using a membrane evaporation technique with an ultrafiltration device comprising a hydrophobic membrane.

Figure 4B:
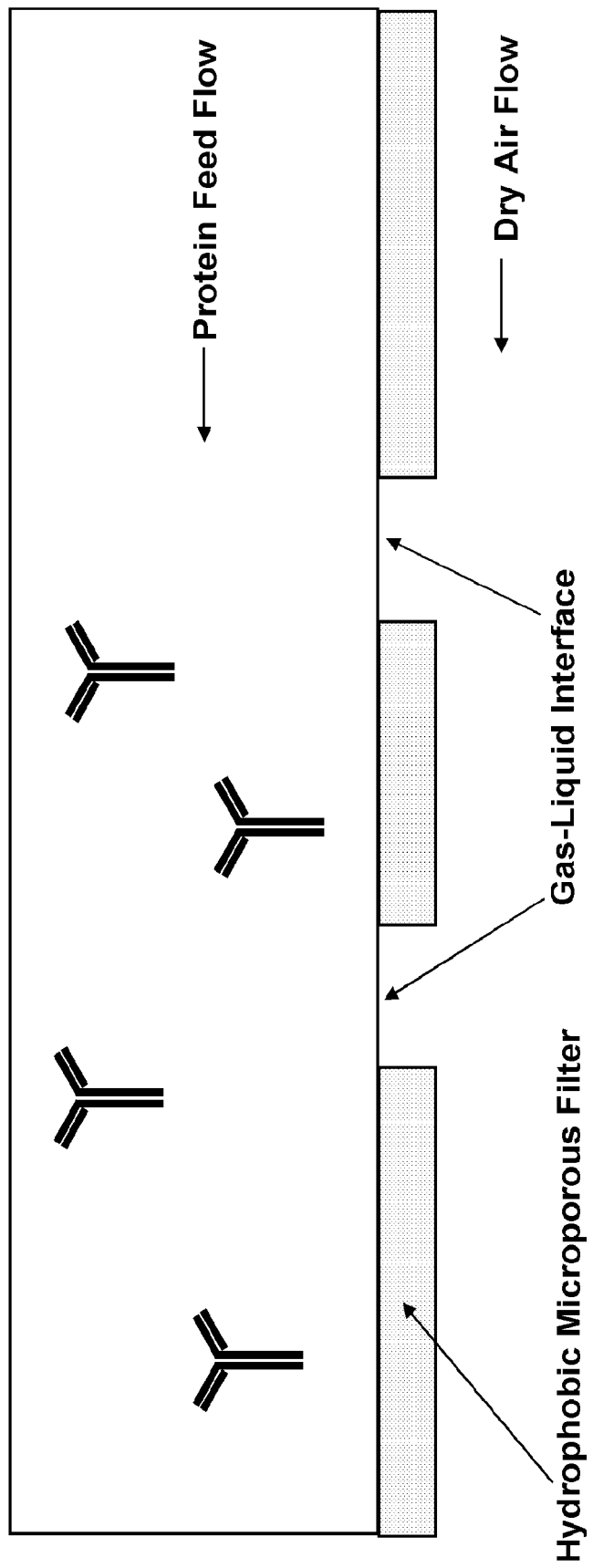
FIG. 4 is a schematic comparison between the ultrafiltration (UF) membrane evaporation technique using a hydrophilic UF membrane (FIG. 4A) and the hydrophobic membrane evaporation technique using a hydrophobic microporous membrane (FIG. 4B).

FIG. 4 shows a schematic comparison between the ultrafiltration (hydrophilic) membrane evaporation technique used in Example 1 (FIG. 4A) and the hydrophobic membrane evaporation technique used in this example (FIG. 4B). The gaseous phase was present only within the pores of the hydrophobic membrane during the operation. Air flow was applied on the permeate side of the device. In this setup, the solvent evaporated into the air in the membrane pores and was gradually removed by the air flowing on the permeate side. The gradual removal of solvent concentrated the protein solution. The protein was in contact with the air-liquid interface on the retentate side of the membrane, which created potential for some protein damage. A stirred cell made by Millipore (Amicon 8010, Billerica, Mass.) with a hydrophobic microporous Durapore PVDF membrane was used.

As above, the mAb1 material was obtained from the conventional ultrafiltration pool that results from a full purification process. The protein was at 171 g/L in 6 mM histidine, 8 mM methionine, pH 6.0 buffer. This material was used as the starting load for the experiments.

The load material was processed using a 26 mm (diameter) circular piece of hydrophobic microporous Durapore PVDF membrane (Millipore GVHP04700 (lot R5BN49933)). The membrane was installed, wet with 70% ethanol, and flushed with buffer before use. The system was stirred at 38 RPM with a power stirrer (Glas-Col 099DGT31) and an impeller through an opening in the top. When not in use, the system was completely sealed.

During the membrane evaporation method, house (ambient) air was blown through holes in the stirred cell base plate on the permeate side of the membrane at 1.0 psig.

The final concentrations measured as absorbance at 280 nm are listed in Table 3 along with SEC results. HPLC-SEC analysis was performed with the sample diluted to 1 mg/ml prior to loading on the HPLC column.

TABLE 3

|  | Concentration (g/L) | % HMW | % LMW |
|---|---|---|---|
| Load | 171 | 3.8 | 0.2 |
| Pool | 387 | 3.5 | 0.1 |

The HPLC-SEC results indicated that the presence of the air-liquid interface in the hydrophobic microporous membrane evaporation technique did not affect the protein characteristics.

Example 4

The objective of the experiments was to concentrate an Fc-fusion protein (Fc1) using a membrane evaporation technique in an ultrafiltration device comprising a stirred cell. A stirred cell made by Millipore (Amicon 8010, Billerica, Mass.) with a 30 kDa ultrafiltration membrane was used in a manner consistent with traditional UF, with the exception of the use of the novel evaporative concentration technique of the present invention.

The material was obtained from the conventional ultrafiltration pool that results from a full purification process. The load material was processed using a 30 kDa regenerated cellulose membrane (Millipore PLCTK). The new filters were rinsed with water prior to use to remove the storage solution. The system was stirred at 80 RPM with a power stirrer (Glas-Col 099DGT31) and an impeller through an opening in the top. When not in use, the system was completely sealed.

During the membrane evaporation method, house (ambient) air was blown through holes in the stirred cell base plate on the permeate side of the membrane at 1.2 psig.

Figure 5:
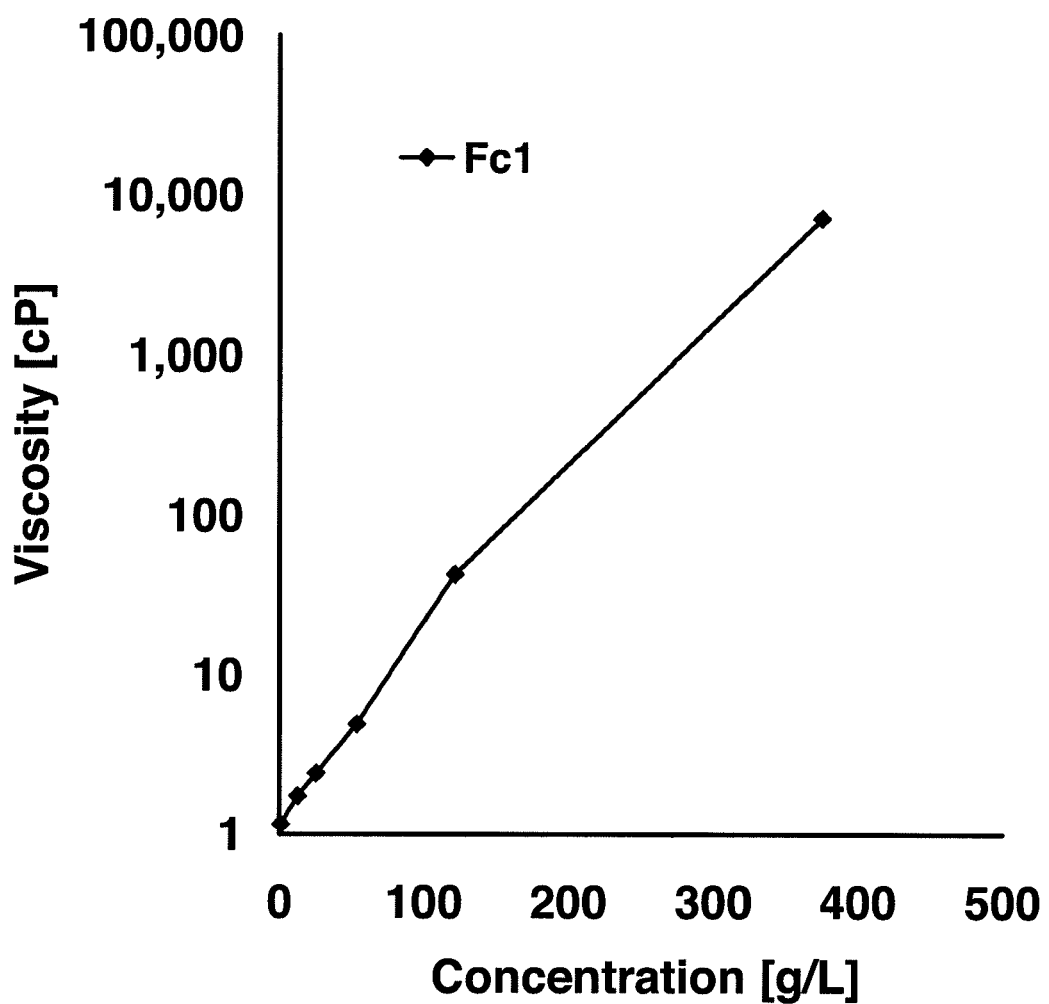
FIG. 5 depicts the increase in viscosity of an Fc-fusion protein solution (Y-Axis; [cP]) with the increasing protein concentration in protein solution (X-Axis; (g/L)) concentrated using a stirred cell ultrafiltration device.

Using the stirred cell membrane evaporation device, final protein concentration exceeded the maximum protein concentration achievable with conventional ultrafiltration, even with significantly increased solution viscosity (FIG. 5). The final concentrations measured as absorbance at 280 nm are listed in Table 4, along with SEC results. HPLC-SEC analysis was performed with the sample diluted to 1 mg/ml prior to loading on the HPLC column.

TABLE 4

|  | Concentration (g/L) | % HMW |
|---|---|---|
| Load | 90 | 2.6 |
| Pool | 375 | 4.6 |

The HPLC-SEC results indicated that the operation did result in a small increase in protein HMW levels. The amount of protein damage is considered small, though, because the difference in % HMW was only about 2%. These experiments indicate that the technique can be used with therapeutic proteins other than antibodies.

Example 5

The objective of the experiments was to concentrate mAb1 using a membrane evaporation technique in an ultrafiltration device comprising a large scale tangential flow filtration (TFF) module. TFF (also known as cross-flow filtration) can be applied to a hollow fiber device or a plate and frame device. A TFF module made by Sartorius AG (Goettingen, Germany) with a 30 kDa ultrafiltration membrane was used in a manner consistent with traditional UF, with the exception of the use of the novel evaporative concentration technique of the present invention.

The material was obtained from the conventional ultrafiltration pool that results from a full purification process. During the membrane evaporation method, house (ambient) air was blown through the permeate side of the membrane at 1.2 psig.

Using the TFF membrane evaporation device, final protein concentration exceeded the maximum protein concentration achievable with conventional ultrafiltration, even with significantly increased solution viscosity (data not shown). The UF pool was collected and the concentration and volume of the pool was measured. The filter was then recirculated with wash buffer to recover additional product and the wash buffer was collected. This wash step was repeated, and then the concentrations and volumes of the two wash steps were measured. The final concentrations measured as absorbance at 280 nm, as well as the volumes of the pool and wash samples, are listed in Table 5, along with SEC results. The volumes, concentrations, and yields that would have been obtained from the pool, the pool combined with the first wash, and the pool combined with the first and second wash samples were calculated and are shown in Table 5 as Calculated Virtual Pool Data. HPLC-SEC analysis was performed with the sample diluted to 1 mg/ml prior to loading on the HPLC column.

TABLE 5

| | Sample Data | | | | | Calculated Virtual Pool Data | | |
| --- | --- | --- | --- | --- | --- | --- | --- | --- |
| | Concentration [g/L] | Yield % | Volume [mL] | % HMW | % LMW | Yield % | Volume [mL] | Concentration [g/L] |
| Load | 150 | 100 | 2013 | 0.6 | 0.5 | | | |
| UF Pool | 415 | 62 | 450 | 0.8 | 0.4 | 62 | 450 | 415 |
| Wash1 | 328 | 24 | 224 | 0.8 | 0.4 | 86 | 674 | 386 |
| Wash2 | 154 | 11 | 224 | 0.7 | 0.5 | 98 | 898 | 328 |

The HPLC-SEC results indicated that the operation did not affect the protein characteristics. The recovery of the mAb1 was high and the operation took less than three hours. This indicates that the membrane evaporation technique can be performed at large scale, resulting in good product quality and high yield.

What is claimed is:

1. A method of generating a protein solution comprising at least 200 g/L of protein in an apparatus, comprising the steps of:
   (a) circulating a first protein solution through an ultrafiltration device, wherein the ultrafiltration device comprises a porous membrane with a retentate side and a permeate side,
      wherein the porous membrane is a hydrophilic membrane having a pore size such that proteins within the first protein solution are retained inside the ultrafiltration device, and
      wherein an aqueous buffer is absorbed into the porous membrane, and is present within the pores of the membrane;
   (b) applying a flow of gas to the permeate side of the porous membrane, wherein the aqueous buffer evaporates as gas phase at the permeate side of the membrane; and
   (c) collecting a second protein solution from the retentate side, wherein the second protein solution is a protein solution comprising at least 200 g/L of protein.

2. The method of claim 1, wherein the ultrafiltration device in step (a) is a hollow fiber device, a plate and frame device, a spiral wound device, or a stirred cell device.

3. The method of claim 1, comprising repeating the step (a) of circulating the first protein solution through an ultrafiltration device and the step (b) of applying a flow of gas prior to the step (c) of collecting the second protein solution.

4. The method of claim 1, wherein the first protein solution is an antibody solution or a therapeutic protein solution.

5. The method of claim 4, wherein the antibody solution is a monoclonal antibody solution.

6. The method of claim 1, wherein the method further comprises a first step of generating a protein solution using a conventional ultrafiltration method.

7. The method of claim 1, wherein said flow of gas is applied across the permeate side of a hollow fiber porous membrane.

8. The method of claim 1, wherein said flow of gas is produced by a compressor, a compressed air tank, a fan, a device that heats gas to generate flow, or a vacuum.

9. The method of claim 1, wherein said flow of gas is produced by a vacuum.

10. The method of claim 1, wherein said flow of gas is flow of air.

11. The method of claim 1, wherein said flow of gas is supplied at a pressure of about 100 psig or less.

12. The method of claim 1, wherein said flow of gas is supplied by blowing ambient air with a pressure of about 1-2 psig.

13. The method of claim 1, wherein said first protein solution enters said ultrafiltration device at a flow rate of from about 1 to about 10,000 liters per square meter of membrane area per hour.

14. The method of claim 1, wherein said second protein solution comprises greater than 200 g/L of protein.

15. The method of claim 1, wherein said second protein solution comprises at least 260 g/L of protein.

16. The method of claim 1, wherein said second protein solution comprises at least 300 g/L of protein.

17. The method of claim 1, wherein said second protein solution comprises at least 350 g/L of protein.

18. The method of claim 1, wherein said hydrophilic membrane is a polysulfone membrane.

19. The method of claim 1, wherein said hydrophilic membrane is a cellulose membrane.

20. The method of claim 1, wherein said hydrophilic membrane is a 30 KDa ultrafiltration membrane.

* * * * *